(12) United States Patent
Okamura

(10) Patent No.: US 8,161,743 B2
(45) Date of Patent: Apr. 24, 2012

(54) INTAKE AIR FLOW RATE DETECTION FOR INTERNAL COMBUSTION ENGINE

(75) Inventor: Manabu Okamura, Ayase (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 844 days.

(21) Appl. No.: 12/208,004

(22) Filed: Sep. 10, 2008

(65) Prior Publication Data

US 2009/0101121 A1  Apr. 23, 2009

(30) Foreign Application Priority Data

Oct. 19, 2007 (JP) ................................. 2007-272547

(51) Int. Cl.
*F02B 29/04* (2006.01)
*F02D 23/00* (2006.01)
*F02B 33/00* (2006.01)
*F02B 33/44* (2006.01)

(52) U.S. Cl. ............. 60/599; 60/611; 60/600; 60/605.1; 123/561

(58) Field of Classification Search .................... 60/599, 60/600, 605.1, 605.2, 611; 123/561, 478
See application file for complete search history.

(56) References Cited

U.S. PATENT DOCUMENTS

| | | | | |
|---|---|---|---|---|
| 2,486,047 A * | 10/1949 | Marinelli | ........................ | 417/43 |
| 2,667,150 A * | 1/1954 | Coar | .............. | 123/561 |
| 4,282,713 A * | 8/1981 | Antoku et al. | .................. | 60/600 |
| 4,473,055 A * | 9/1984 | Ito et al. | ........................ | 123/564 |
| 4,489,688 A * | 12/1984 | Ito et al. | .................... | 123/339.27 |
| 4,551,977 A * | 11/1985 | Matsumura | ..................... | 60/611 |
| 4,716,734 A * | 1/1988 | Nakao et al. | ..................... | 60/599 |
| 5,138,839 A * | 8/1992 | Hitomi et al. | .................... | 60/602 |
| 6,052,995 A * | 4/2000 | Krimmer et al. | ................ | 60/611 |
| 6,938,420 B2 * | 9/2005 | Kawamura et al. | ............. | 60/612 |
| 6,983,597 B2 | 1/2006 | Wild et al. | | |
| 7,367,320 B2 | 5/2008 | Komori et al. | | |
| 2003/0083798 A1 * | 5/2003 | Yip et al. | ...................... | 701/101 |
| 2007/0215118 A1 | 9/2007 | Komori et al. | | |

FOREIGN PATENT DOCUMENTS

| | | |
|---|---|---|
| CN | 101042066 A | 9/2007 |
| DE | 102 25 307 A1 | 12/2003 |
| EP | 1 460 247 A1 | 9/2004 |
| JP | 08-144811 A | 6/1996 |
| WO | WO 2006/137279 A1 | 12/2006 |

* cited by examiner

*Primary Examiner* — Thomas Denion
*Assistant Examiner* — Cameron Setayesh
(74) *Attorney, Agent, or Firm* — Foley & Lardner LLP

(57) ABSTRACT

An intake air flow rate detection device for an internal combustion engine (100), including a sensor (61, 63) that detects an operating condition of the internal combustion engine (100), an air flow meter (21) that disposed in the intake passage (20) upstream of the supercharging device (41), and a programmable controller (60) programmed to calculate a measured intake air flow rate from a detection value of the air flow meter (21), calculate a calculated intake air flow rate from the operating condition of the internal combustion engine (100), and employ either the measured intake air flow rate or the calculated intake air flow rate as an intake air flow rate of the intake passage (20) on the basis of an air flow rate of air that is circulated to the intake passage (20) between the air flow meter (21) and the supercharging device (41) through the bypass passage (51).

10 Claims, 5 Drawing Sheets

INTAKE AIR FLOW RATE DETECTION FOR INTERNAL COMBUSTION ENGINE

FIELD OF THE INVENTION

This invention relates to detection of an intake air flow rate of a supercharging internal combustion engine.

BACKGROUND OF THE INVENTION

JPH08-144811A, published by the Japan Patent Office in 1996, discloses a supercharging internal combustion engine comprising an air flow meter, a compressor of a turbocharger disposed on a downstream side of the air flow meter, a throttle disposed on a downstream side of the compressor, a bypass passage that bifurcates from an intake passage between the compressor and the throttle and converges with the intake passage between the air flow meter and the compressor, and a bypass valve that opens and closes the bypass passage. The bypass valve is controlled to circulate air on the downstream side of the compressor between the air flow meter and the compressor, thereby ensuring that a supercharging pressure does not increase excessively.

When the throttle of the internal combustion engine is fully closed during vehicle deceleration, the air flow rate of air circulated to the upstream side increases, and therefore the circulated air flows back to the air flow meter. As a result, the precision with which the air flow meter detects an intake air flow rate deteriorates. The supercharging internal combustion engine according to the prior art suppresses deterioration of the intake air flow rate detection precision by limiting a detection signal from the air flow meter to a predetermined range during vehicle deceleration.

SUMMARY OF THE INVENTION

However, depending on the air flow rate of the circulated air, in certain cases the circulated air does not flow back to the air flow meter even during vehicle deceleration. The supercharging internal combustion engine according to the prior art limits the output of the air flow meter to the predetermined limitation range every time the vehicle decelerates, even in cases where the circulated air does not flow back to the air flow meter, and therefore control is not always performed appropriately in accordance with an engine operating condition.

It is therefore an object of this invention to realize an intake air flow rate detection for an internal combustion engine with which deterioration of the detection precision of an intake air flow rate can be suppressed in accordance with an engine operating condition.

To achieve this object, this invention provides an intake air flow rate detection device for an internal combustion engine, the engine comprising an intake passage through which intake air flows, a supercharging device that supercharges the intake air, a throttle that throttles the intake air downstream of the supercharging device, a bypass passage that bifurcates between the supercharging device and the throttle and converges with the intake passage upstream of the supercharging device, and a bypass valve that opens and closes the bypass passage, the detection device comprising a sensor that detects an operating condition of the internal combustion engine, an air flow meter that disposed in the intake passage upstream of the supercharging device, and a programmable controller programmed to calculate a measured intake air flow rate from a detection value of the air flow meter, calculate a calculated intake air flow rate from the operating condition of the internal combustion engine, and employ either the measured intake air flow rate or the calculated intake air flow rate as an intake air flow rate of the intake passage on the basis of an air flow rate of air that is circulated to the intake passage between the air flow meter and the supercharging device through the bypass passage.

This invention provides an intake air flow rate detection method for the internal combustion engine, the method comprising detecting an operating condition of the internal combustion engine, detecting an intake air flow rate using an air flow meter disposed in the intake passage upstream of the supercharging device, calculating a measured intake air flow rate from a detection value of the air flow meter, calculating a calculated intake air flow rate from the operating condition of the internal combustion engine, and employing either the measured intake air flow rate or the calculated intake air flow rate as an intake air flow rate of the intake passage on the basis of an air flow rate of air that is circulated to the intake passage between the air flow meter and the supercharging device through the bypass passage.

The details as well as other features and advantages of this invention are set forth in the remainder of the specification and are shown in the accompanying drawings.

DESCRIPTION OF THE PREFERRED EMBODIMENTS

Referring to FIGS. 1-4 of the drawings, a first embodiment of this invention will be described.

Figure 1:
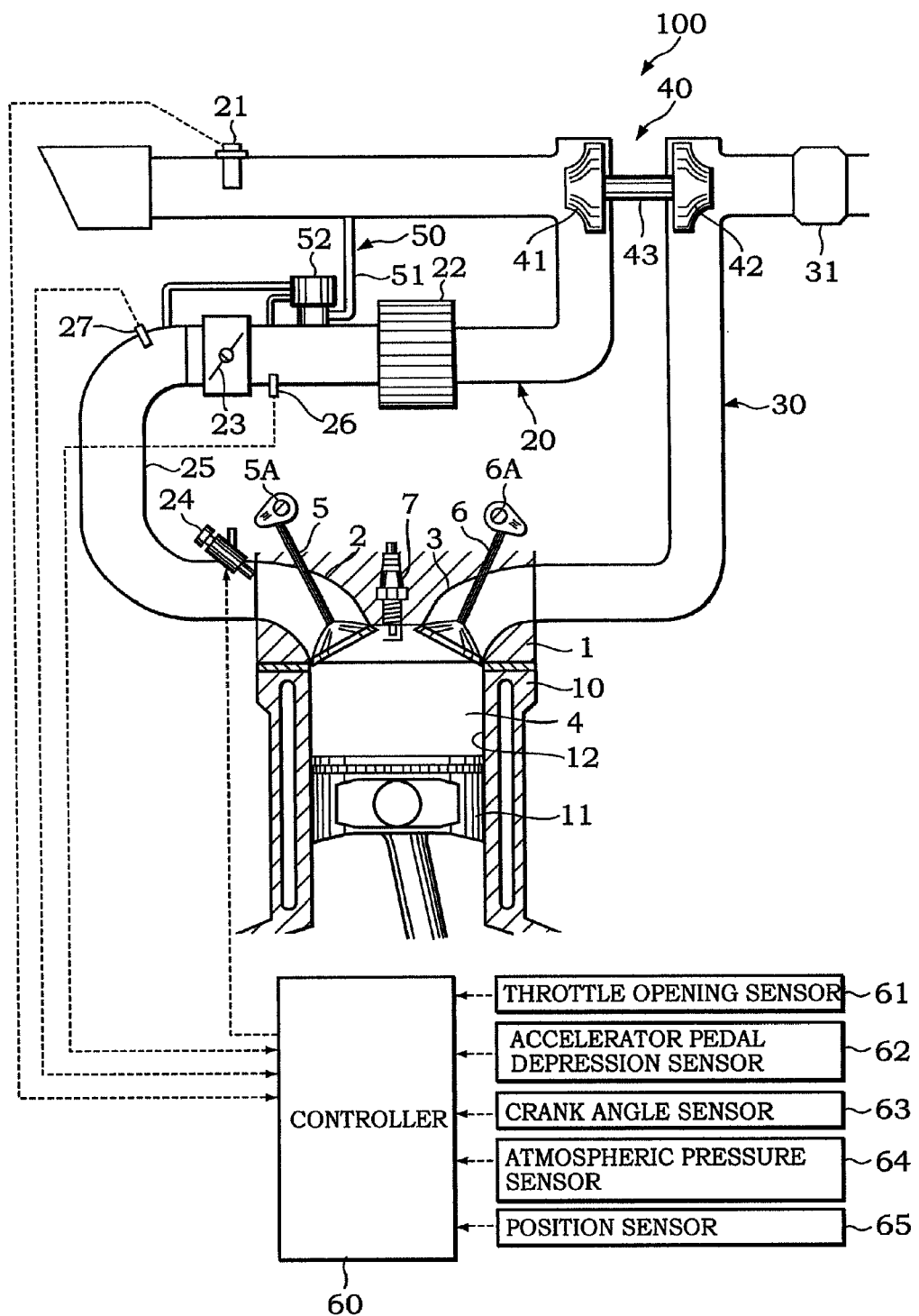
FIG. 1 is a schematic diagram of an internal combustion engine according to this invention.

Referring to FIG. 1, an internal combustion engine 100 for a vehicle comprises a cylinder block 10, and a cylinder head 1 disposed on an upper side of the cylinder block 10.

A cylinder 12 accommodating a piston 11 is formed in the cylinder block 10. A combustion chamber 4 is formed by a crown surface of the piston 11, a wall surface of the cylinder 12, and a lower surface of the cylinder head 1. When an air-fuel mixture is burned in the combustion chamber 4, the piston 11 receives combustion pressure generated by the combustion, and as a result performs a reciprocating motion within the cylinder 12.

An intake port 2 that supplies the air-fuel mixture to the combustion chamber 4 and an exhaust port 3 that allows exhaust gas to flow out from the combustion chamber 4 are formed in the cylinder head 1.

An intake passage 20 supplies fresh air taken in from the outside to the intake port 2 via an intake manifold 25. An air flow meter 21, a compressor 41 of a turbocharger 40, an intercooler 22, and a throttle 23 are disposed in the intake passage 20 in succession from an intake passage upstream side.

The air flow meter 21 is a hot-wire air flow meter. The air flow meter 21 detects an intake air flow rate of the intake air supplied to the internal combustion engine 100. The air flow meter 21 may be a Karman vortex air flow meter.

The turbocharger 40 comprises the compressor 41 disposed in the intake passage 20, a turbine 42 disposed in an exhaust passage 30, and a shaft 43. The compressor 41 and the turbine 42 are connected by the shaft 43. The compressor 41 of the turbocharger 40 is driven by rotating the turbine 42 using the exhaust gas discharged from the internal combustion engine 100, and serves to supercharge the intake air flowing through the intake passage 20.

The intercooler 22 is disposed in the intake passage 20 on the downstream side of the compressor 41 of the turbocharger 40. The intercooler 22 cools intake air that has been compressed to a high temperature by the compressor 41.

The throttle 23 is disposed in the intake passage 20 on the downstream side of the intercooler 22. The throttle 23 adjusts the flow rate of the intake air that is introduced into the combustion chamber 4 by varying an intake air flow area of the intake passage 20. Having passed through the throttle 23, the intake air is distributed to each cylinder of the internal combustion engine 100 via the intake manifold 25.

A supercharging pressure sensor 26 that detects a supercharging pressure in the intake passage 20 is disposed in the intake passage 20 on the upstream side of the throttle 23. Further, a manifold pressure sensor 27 that detects a manifold pressure in the intake manifold 25 is disposed in the intake manifold 25 on the downstream side of the throttle 23.

A fuel injection valve 24 that injects fuel toward an opening portion of the intake port 2 is provided in the intake manifold 25. The fuel injection valve 24 forms the air-fuel mixture by injecting fuel in accordance with an engine operating condition.

The turbine 42 of the turbocharger 40 and a three-way catalytic converter 31 are disposed in succession in the exhaust passage 30 connected to the exhaust port 3. The three-way catalytic converter 31 purifies the exhaust gas discharged from the internal combustion engine 100.

An intake valve 5 that opens and closes the intake port 2 and an exhaust valve 6 that opens and closes the exhaust port 3 are provided in the cylinder head 1 of the internal combustion engine 100.

The intake valve 5 is driven by an intake cam 5A. When the intake valve 5 opens the intake port 2, the air-fuel mixture formed in the intake port 2 is supplied to the combustion chamber 4. The supplied air-fuel mixture is ignited by a spark plug 7, which is provided in the cylinder head 1 on an upper side of the combustion chamber 4, and burned. When the exhaust valve 6 is driven by an exhaust cam 6A to open the exhaust port 3, exhaust gas generated by the combustion is discharged to the exhaust passage 30. The exhaust gas discharged to the exhaust passage 30 is purified by the three-way catalytic converter 31 after rotating the turbine 42 of the turbocharger 40, and then discharged to the outside.

The internal combustion engine 100 comprises an air circulation device 50 that circulates a part of the supercharged intake air to the upstream side of the compressor 41 to ensure that the supercharging pressure of the intake air supercharged by the compressor 41 does not increase excessively. The air circulation device 50 comprises a bypass passage 51 and a bypass valve 52.

One end of the bypass passage 51 is connected to the intake passage 20 between the air flow meter 21 and the compressor 41. The other end of the bypass passage 51 is connected to the intake passage 20 between the intercooler 22 and the throttle 23 via the bypass valve 52.

The bypass valve 52 is a differential pressure-operated valve mechanism that opens and closes the bypass passage 51 in accordance with the engine operating condition.

Calculation of the intake air flow rate corresponding to the operating condition of the internal combustion engine 100 and control of the fuel injection valve 24 are performed by a controller 60. The controller 60 is constituted by a microcomputer comprising a central processing unit (CPU), read-only memory (ROM), random access memory (RAM), and an input/output interface (I/O interface). The controller 60 may be constituted by a plurality of microcomputers.

Detection data from the air flow meter 21, the supercharging pressure sensor 26, the manifold pressure sensor 27, a throttle opening sensor 61 that detects an opening of the throttle 23, an accelerator pedal depression sensor 62 that detects a depression amount of an accelerator pedal provided in the vehicle, a crank angle sensor 63 that generates a crank angle signal at predetermined crank angle intervals of the internal combustion engine 100, and an atmospheric pressure sensor 64 that detects atmospheric pressure are input respectively into the controller 60 as signals.

The controller 60 calculates the intake air flow rate on the basis of these input signals, and then controls a fuel injection amount of the fuel injection valve 24.

Figure 2:
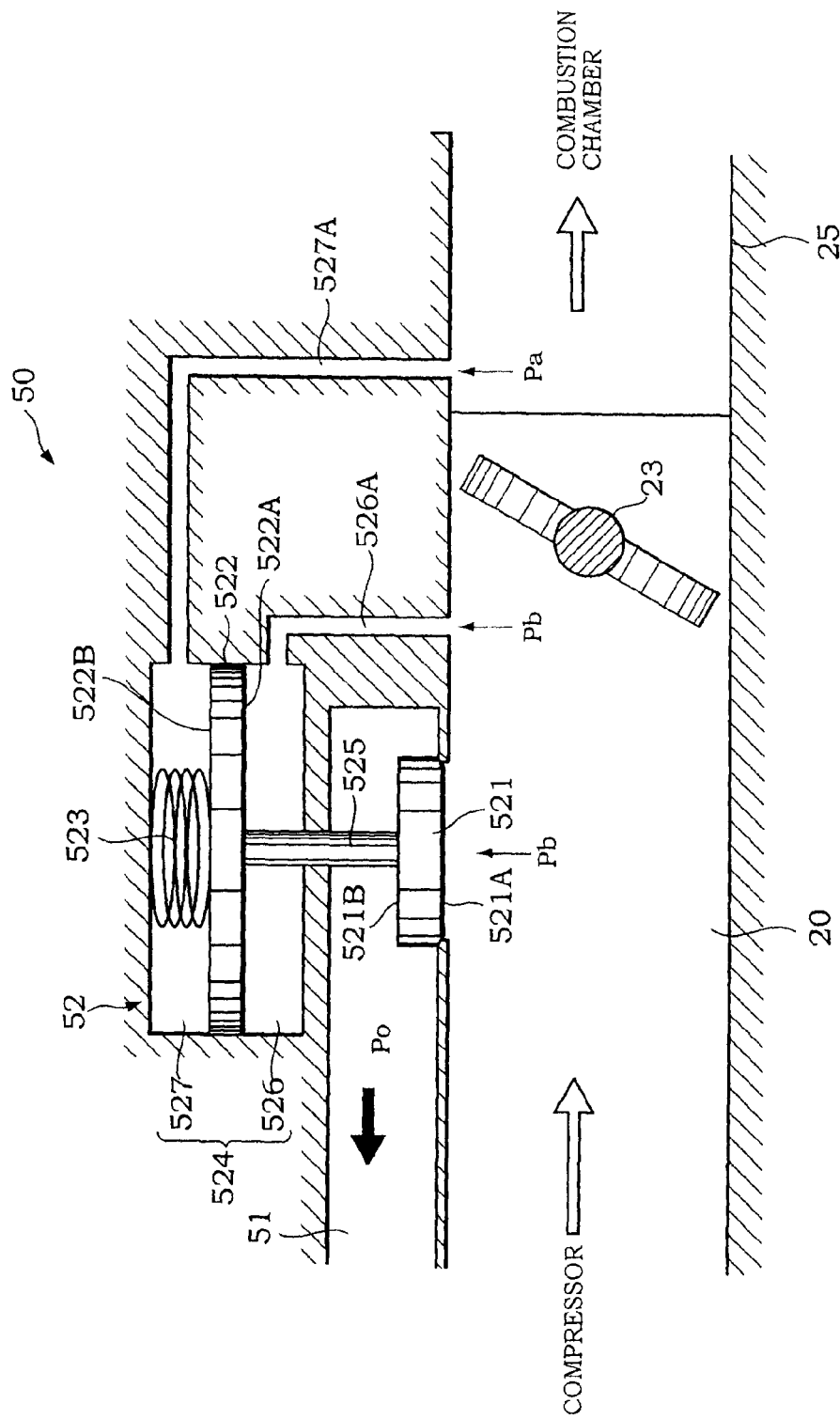
FIG. 2 is a schematic diagram of an air circulation device provided in the internal combustion engine.

Referring to FIG. 2, the bypass valve 52 of the air circulation device 50 will be described.

The bypass valve 52 comprises a valve body 521, a piston 522, a coil spring 523, and a pressure introduction chamber 524.

The valve body 521 is formed integrally with the piston 522 via a shaft 525. The valve body 521 opens and closes the bypass passage 51 communicating with the intake passage 20. The valve body 521 includes an intake passage side pressure reception portion 521A and a bypass passage side pressure reception portion 521B. A supercharging pressure Pb in the intake passage 20 on the upstream side of the throttle 23 acts on the intake passage side pressure reception portion 521A. A pressure $P_0$ in the bypass passage 51, which substantially corresponds to the atmospheric pressure, acts on the bypass passage side pressure reception portion 521B.

The piston 522 is disposed slidably within the pressure introduction chamber 524. The piston 522 partitions the pressure introduction chamber 524 into a supercharging pressure introduction chamber 526 and a manifold pressure introduction chamber 527. The piston 522 includes a supercharging pressure side pressure reception portion 522A on the supercharging pressure introduction chamber side, and a manifold pressure side pressure reception portion 522B on the manifold pressure introduction chamber side.

The supercharging pressure introduction chamber 526 communicates with the intake passage 20 on the upstream side of the throttle 23 via a communicating passage 526A. Hence, the supercharging pressure Pb is introduced into the supercharging pressure introduction chamber 526.

The manifold pressure introduction chamber 527 communicates with the intake manifold 25 on the downstream side of the throttle 23 via a communicating passage 527A. Hence, a manifold pressure Pa in the intake manifold 25 on the downstream side of the throttle 23 is introduced into the manifold pressure introduction chamber 527. The coil spring 523 is disposed in the manifold pressure introduction chamber 527 in a compressed state so as to push the valve body 521 downward in a closing direction.

When the supercharging pressure Pb is equal to the manifold pressure Pa in the air circulation device 50, a valve closing force, which comprises a reactive force of the coil spring 523, a force occurring on the manifold pressure side pressure reception portion 522B as a result of the manifold pressure Pa, and a force occurring on the bypass passage side pressure reception portion 521B as a result of the atmospheric pressure $P_0$, becomes greater than a valve opening force, which comprises forces occurring on the intake passage side pressure reception portion 521A and the supercharging pressure side pressure reception portion 522A as a result of the supercharging pressure Pb. Therefore the valve body 521 is pushed downward toward the lower side of the figure, thereby closing the bypass passage 51.

When the supercharging pressure Pb increases beyond the manifold pressure Pa such that the valve opening force exceeds the valve closing force, on the other hand, the valve body 521 is pushed upward toward the upper side of the figure, thereby opening the bypass passage 51. As a result, a part of the intake air supercharged thereby passes through the bypass passage 51 so as to be circulated to the intake passage 20 on the upstream side of the compressor 41.

An opening D (to be referred to hereafter as a bypass valve opening D) of the valve body 521 of the bypass valve 52 is calculated from the supercharging pressure Pb detected by the supercharging pressure sensor 26, the manifold pressure Pa detected by the manifold pressure sensor 27, and the atmospheric pressure $P_0$ detected by the atmospheric pressure sensor 64 using the following Equation (1).

$$D = \frac{(Pb - Pa) \times Sa + (Pb - P_0) \times Sb - k \times x_0}{k} \quad (1)$$

D: bypass valve opening
Pa: manifold pressure
Pb: supercharging pressure
$P_0$: atmospheric pressure
Sa: surface area of supercharging pressure side pressure reception portion 522A and manifold pressure side pressure reception portion 522B of piston 522
Sb: surface area of intake passage side pressure reception portion 521A and bypass passage side pressure reception portion 521B of valve body 521
k: spring constant of coil spring 523
$x_0$: initial stroke of coil spring 523

In the internal combustion engine 100, when a driver stops depressing the accelerator pedal during vehicle travel, for example, the throttle 23 closes fully. When the throttle 23 is fully closed, the amount of exhaust gas discharged from the internal combustion engine 100 decreases rapidly. However, the compressor 41 of the turbocharger 40 does not stop immediately but continues to rotate due to inertial force, and therefore the supercharging pressure of the intake air between the compressor 41 and the throttle 23 increases. In such a case, the bypass valve 52 of the air circulation device 50 opens the bypass passage 51 so that air is circulated to the upstream side of the compressor 41, and as a result, the supercharging pressure does not increase excessively.

When the bypass valve 52 opens the bypass passage 51 but the bypass valve opening D is small, the air circulated to the intake passage 20 from the bypass passage 51 continues to flow downstream through the intake passage 20 and flows back to the compressor 41.

When the bypass valve opening D is large, however, the air flow rate of the circulated air increases, and a part of the circulated air flows back to the air flow meter 21, with the result that the precision with which the air flow meter 21 detects the intake air flow rate deteriorates.

When the detection precision of the air flow meter 21 deteriorates, a difference may occur between the intake air flow rate calculated on the basis of the detection signal from the air flow meter 21 and the actual intake air flow rate. Hence, when the fuel injection amount of the fuel injection valve 24 is determined on the basis of the calculated intake air flow rate, the fuel injection amount becomes too large or too small relative to the actual intake air flow rate, and as a result, the driving performance and exhaust emission deteriorate.

Hence, in this embodiment, the intake air flow rate is calculated on the basis of the bypass valve opening D of the air circulation device 50 so that even when the circulated air flows back to the air flow meter side, deterioration of the intake air flow rate detection precision is suppressed.

Figure 3:
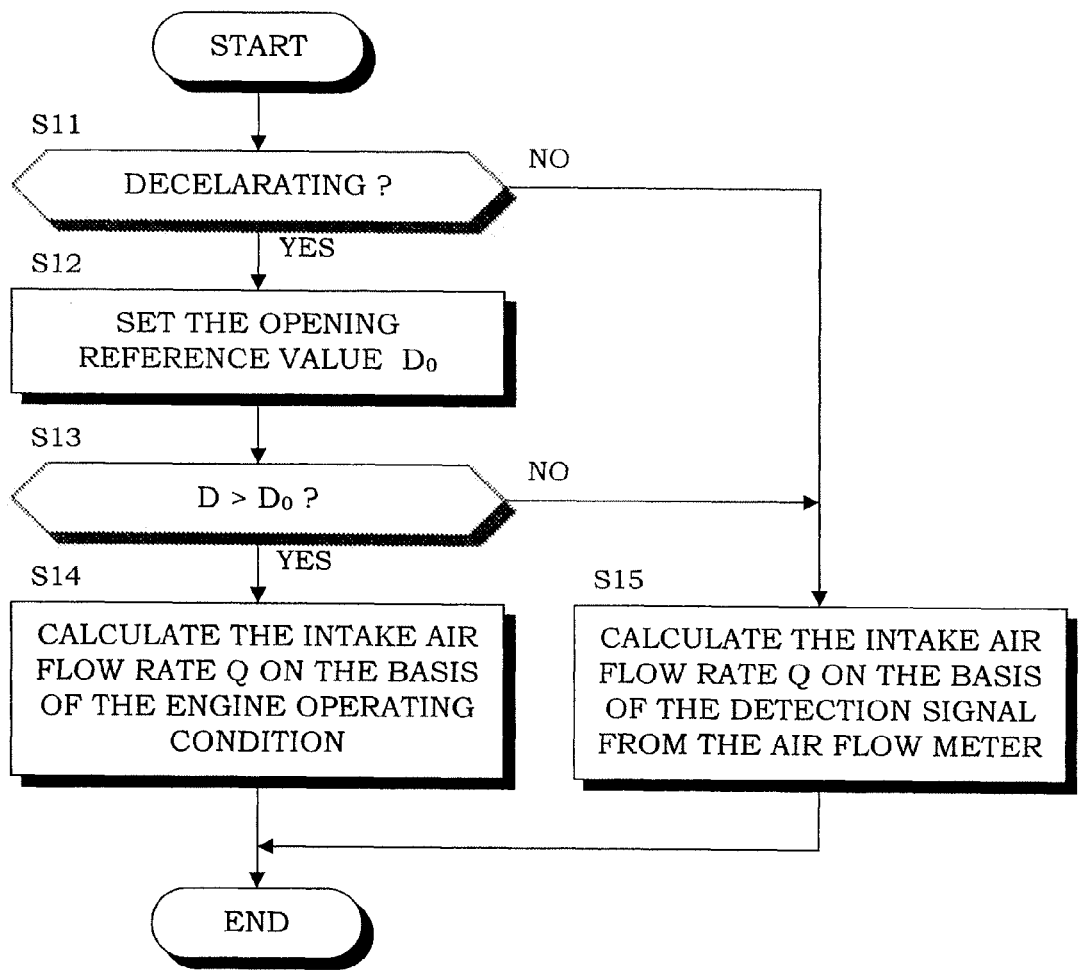
FIG. 3 is a flowchart illustrating an intake air flow rate calculation routine executed by a controller according to this invention.

Referring to FIG. 3, intake air flow rate calculation routine executed by the controller 60 will be described. The intake air flow rate calculation routine is implemented together with the start of an engine operation, and is executed repeatedly at fixed intervals, for example periods of 10 milliseconds.

In a step S11, the controller 60 determines whether or not the vehicle is decelerating. Vehicle deceleration is determined by detecting the depression amount of the accelerator pedal using the accelerator pedal depression sensor 62.

When it is determined that the vehicle is decelerating, or in other words the throttle 23 is fully closed, the controller 60 performs the processing of a step S12. On the other hand, when it is determined that the vehicle is not decelerating, or in other words the throttle 23 is not fully closed, the controller 60 performs the processing of a step S15.

It should be noted that the processing of the step S11 may be omitted.

In the step S12, the controller 60 calculates an engine rotation speed Ne on the basis of the crank angle signal from the crank angle sensor 63, and sets an opening reference value $D_0$ of the bypass valve 52 on the basis of the engine rotation speed Ne.

Figure 4:
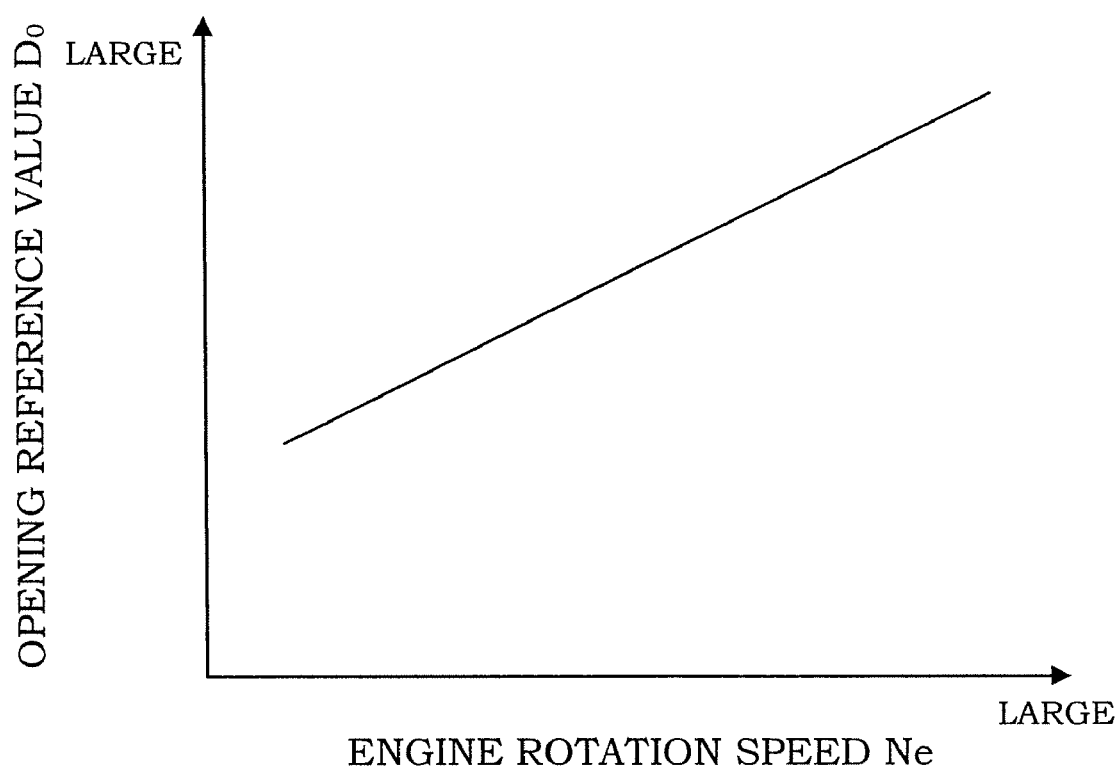
FIG. 4 is a diagram illustrating a relationship between an engine rotation speed and a predetermined value of a bypass valve opening.

Referring to FIG. 4, the opening reference value $D_0$ is set to increase as the engine rotation speed Ne increases. When the engine rotation speed increases such that the flow rate of the exhaust gas discharged from the internal combustion engine 100 increases, the rotation speed of the compressor 41 rises so that the circulated air flows more easily downstream through the intake passage 20. When the engine rotation speed Ne increases in this manner, the circulated air is less likely to flow back to the air flow meter side, and therefore the opening reference value $D_0$ is set to increase as the engine rotation speed increases.

Returning again to FIG. 3, in a step S13, the controller 60 determines whether or not the bypass valve opening D calculated from the supercharging pressure Pb, the manifold pressure Pa and the atmospheric pressure $P_0$ is greater than the opening reference value $D_0$.

When the bypass valve opening D is greater than the opening reference value $D_0$, it is determined that the air flow rate of the circulated air is large, and accordingly that the circulated air may flow back to the air flow meter 21. Hence, the controller 60 performs the processing of a step S14. When the bypass valve opening D is smaller than the opening reference value $D_0$, on the other hand, it is determined that the circulated air will continue to flow downstream through the intake passage 20 without flowing back, and therefore the controller 60 performs the processing of the step S15.

In the step S14, the controller 60 estimates an intake air flow rate Q on the basis of the engine operating condition, and then terminates the processing.

Specifically, the controller 60 calculates the intake air flow rate Q on the basis of the throttle opening and the engine rotation speed, without using the detection signal of the air flow meter 21, the detection precision of which has deteriorated. Here, the throttle opening is calculated on the basis of the signal from the throttle opening sensor 61.

On the other hand, when the circulated air continues to flow downstream through the intake passage 20 without flowing back, the controller 60 performs the processing of the step S15. In the step S15, the controller 60 calculates the intake air flow rate Q on the basis of the detection signal from the air flow meter 21, and then terminates the processing.

The intake air flow rate detection device according to this embodiment determines whether or not the circulated air will flow back to the air flow meter 21 in accordance with the bypass valve opening D. When an engine operating condition in which the circulated air flows back is present, the intake air flow rate detection device employs the intake air flow rate calculated on the basis of the throttle opening and the engine rotation speed Ne as the intake air flow rate Q in the intake passage 20, and therefore deterioration of the intake air flow rate detection precision can be suppressed in accordance with the engine operating condition. As a result, deterioration of the operating performance and exhaust emission of the internal combustion engine 100 can be suppressed.

Further, when an engine operating condition in which the circulated air flows back is not present even through the vehicle is decelerating, the intake air flow rate detection device employs the intake air flow rate calculated on the basis of the detection signal from the air flow meter 21 as the intake air flow rate Q in the intake passage 20, and therefore the calculation load can be reduced in comparison with the prior art.

Further, the opening reference value $D_0$ is set to increase as the engine rotation speed Ne increases, and therefore the intake air flow rate detection device can execute control that is more suited to the engine operating conditions.

Figure 5:
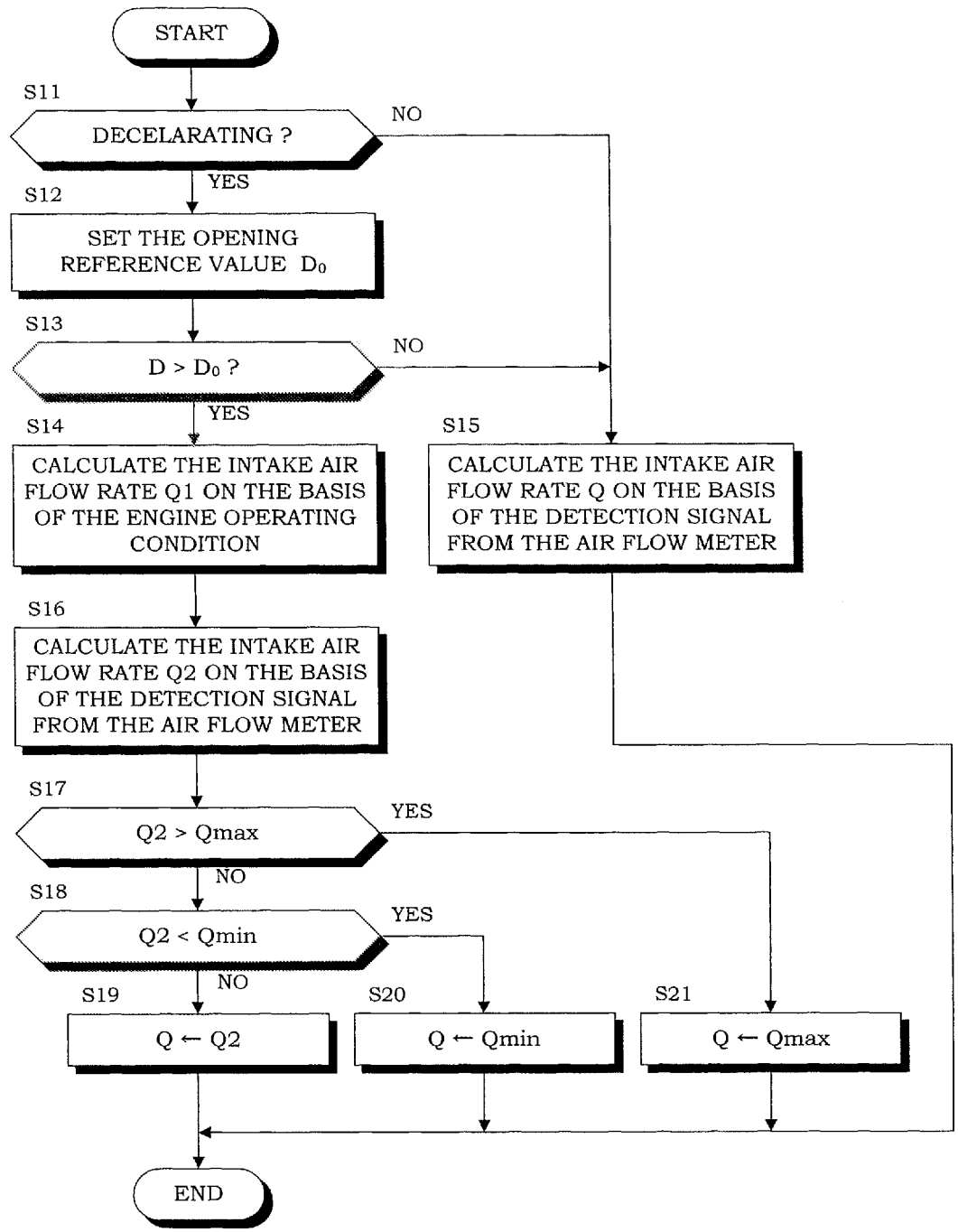
FIG. 5 is a flowchart illustrating an intake air flow rate calculation routine executed by a controller according to a second embodiment of this invention.

Referring to FIG. 5, a second embodiment of this invention will be described.

The constitution of the internal combustion engine 100 according to the second embodiment is substantially identical to that of the first embodiment, but differs partially therefrom in the method of calculating the intake air flow rate when the bypass valve opening D is larger than the opening reference value $D_0$. More specifically, limit values are set in relation to the intake air flow rate calculated on the basis of the detection signal from the air flow meter 21, and the following description will focus on this difference.

FIG. 5 is a flowchart showing an intake air flow rate calculation routine executed by the controller 60 of the internal combustion engine 100 according to the second embodiment. The intake air flow rate calculation routine is implemented together with the start of an engine operation, and is executed repeatedly at fixed intervals, for example periods of 10 milliseconds.

The control of steps S11-S15 is similar to that of the first embodiment, and description thereof has been omitted.

After calculating an intake air flow rate Q1 on the basis of the engine operating condition in the step S14, the controller 60 calculates an intake air flow rate Q2 on the basis of the detection signal from the air flow meter 21 in a step S16.

In a step S17, the controller 60 determines whether or not the intake air flow rate Q2 calculated on the basis of the detection signal from the air flow meter 21 is greater than an upper limit value $Q_{max}$.

When the intake air flow rate Q2 is smaller than the upper limit value $Q_{max}$, it is determined that even if the circulated air flows back to the air flow meter side, the effect thereof will be small, and therefore the controller 60 performs the processing of a step S18. When the intake air flow rate Q2 is larger than the upper limit value $Q_{max}$, on the other hand, it is determined that backflow of the circulated air will cause the detection precision of the air flow meter 21 to deteriorate, and therefore the controller 60 performs the processing of a step S21.

The upper limit value $Q_{max}$ is calculated from the intake air flow rate Q1 determined in the step S14 and an upper limit side correction coefficient $K_{max}$ using the following Equation (2). Hence, the upper limit value $Q_{max}$ takes a value that varies in accordance with the intake air flow rate Q1.

$$Q_{max} = Q1 \times K_{max} \tag{2}$$

$Q_{max}$: upper limit value
Q1: intake air flow rate calculated on the basis of the engine operating condition
$K_{max}$: upper limit side correction coefficient In the step S18, the controller 60 determines whether or not the intake air flow rate Q2 calculated on the basis of the detection signal from the air flow meter 21 is smaller than a lower limit value $Q_{min}$. When the intake air flow rate Q2 is larger than the lower limit value $Q_{min}$, it is determined that even if the circulated air flows back to the air flow meter side, the effect thereof will be small, and therefore the controller 60 performs the processing of a step S19. When the intake air flow rate Q2 is smaller than the lower limit value $Q_{min}$, on the other hand, it is determined that backflow of the circulated air will cause the detection precision of the air flow meter 21 to deteriorate, and therefore the controller 60 performs the processing of a step S20.

The lower limit value $Q_{min}$ is calculated from the intake air flow rate Q1 determined in the step S14 and a lower limit side correction coefficient $K_{min}$ using the following Equation (3). Hence, the lower limit value $Q_{min}$ takes a value that varies in accordance with the intake air flow rate Q1.

$$Q_{min} = Q1 \times K_{min} \tag{3}$$

$Q_{min}$: lower limit value
Q1: intake air flow rate calculated on the basis of the engine operating condition
$K_{min}$: lower limit side correction coefficient When the intake air flow rate Q2 calculated on the basis of the detection signal from the air flow meter 21 is larger than the lower limit value $Q_{min}$ and smaller than the upper limit value $Q_{max}$, backflow of the circulated air to the air flow meter side has only a small effect, and does not therefore pose a problem in terms of the detection precision of the air flow meter 21. Hence, in the step S19, the controller 60 sets the intake air flow rate Q2 calculated on the basis of the detection signal from the air flow meter 21 as the intake air flow rate Q, and then terminates the processing.

When the intake air flow rate Q2 is smaller than the lower limit value $Q_{min}$, on the other hand, the circulated air causes the detection precision of the air flow meter 21 to deteriorate. Therefore, in the step S20, the controller 60 sets the lower limit value $Q_{min}$ as the intake air flow rate Q without using the intake air flow rate Q2 calculated on the basis of the detection signal from the air flow meter 21, and then terminates the processing.

Further, when the intake air flow rate Q2 is larger than the upper limit value $Q_{max}$, the circulated air causes the detection precision of the air flow meter 21 to deteriorate. Therefore, in the step S21, the controller 60 sets the upper limit value $Q_{max}$ as the intake air flow rate Q without using the intake air flow rate Q2 calculated on the basis of the detection signal from the air flow meter 21, and then terminates the processing.

According to the intake air flow rate detection device of this embodiment, the intake air flow rate Q in the intake passage 20 is set in accordance with the intake air flow rate calculated on the basis of the engine operating condition and the intake air flow rate calculated on the basis of the detection signal from the air flow meter only when a determination has been made as to whether or not the engine operating condition in which the circulated air flows back is present, and therefore similar effects to those of the first embodiment can be obtained.

When the intake air flow rate calculated on the basis of the detection signal from the air flow meter 21 exceeds the lower limit value $Q_{min}$ or the upper limit value $Q_{max}$, the intake air flow rate detection device sets the lower limit value $Q_{min}$ or the upper limit value $Q_{max}$ as the intake air flow rate Q, and therefore, even if the detection precision of the air flow meter 21 deteriorates, deterioration of the operating performance and exhaust emission of the internal combustion engine 100 can be suppressed. Moreover, torque shock caused by variation in the intake air flow rate can be suppressed.

The contents of JP2007-272547, with a filing date of Oct. 19, 2007 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

It should be noted that in the first and second embodiments, the method of calculating the intake air flow rate is modified in accordance with the bypass valve opening D, but since the air flow rate of the circulated air increases as the bypass valve opening D increases, the method of calculating the intake air flow rate may be modified in accordance with the air flow rate.

In the first and second embodiments, the bypass valve opening D is calculated on the basis of the supercharging pressure Pb, the manifold pressure Pa, and the atmospheric pressure $P_0$, but this invention is not limited thereto. Specifically, a position sensor 65 that detects the position of the valve body 521 of the bypass valve 52 may be provided in the air circulation device 50, and the bypass valve opening D may be calculated on the basis of a detection signal from the position sensor 65.

Further, in the first and second embodiments, the determination as to whether or not the throttle is fully closed is made in accordance with the deceleration condition of the vehicle. However, this invention is not limited to vehicle deceleration. For example, in a vehicle having a manual transmission, an operating condition in which the throttle opening closes fully is reached when the accelerator pedal is switched OFF and a clutch pedal is depressed for upshifting the transmission during acceleration of the vehicle. By applying this invention to such a case, situations in which circulated air causes the intake air flow rate detection precision to deteriorate can be suppressed.

The embodiments of this invention in which an exclusive property or privilege are claimed are defined as follows:

1. An intake air flow rate detection device for an internal combustion engine, the engine comprising an intake passage through which intake air flows, a supercharging device that supercharges the intake air, a throttle that throttles the intake air downstream of the supercharging device, a bypass passage that bifurcates between the supercharging device and the throttle and converges with the intake passage upstream of the supercharging device, and a bypass valve that opens and closes the bypass passage, the detection device comprising:
   a sensor that detects an operating condition of the internal combustion engine;
   an air flow meter disposed in the intake passage upstream of the supercharging device; and
   a programmable controller programmed to:
     calculate a measured intake air flow rate from a detection value of the air flow meter;
     calculate a calculated intake air flow rate from the operating condition of the internal combustion engine; and
     employ either the measured intake air flow rate or the calculated intake air flow rate as an intake air flow rate of the intake passage on the basis of a bypass air flow rate, which is a flow rate of air that is circulated to the intake passage between the air flow meter and the supercharging device through the bypass passage,
   wherein the controller is further programmed to employ the measured intake air flow rate when the bypass air flow rate is not greater than a threshold value, and employ the calculated intake air flow rate when the bypass air flow rate is greater than the threshold value, the threshold value being a non-zero value beyond which the bypass air flows back to the air flow meter.

2. The intake air flow rate detection device for an internal combustion engine as defined in claim 1, wherein the controller is further programmed to calculate an opening of the bypass valve, employ the measured intake air flow rate as the intake air flow rate when the opening of the bypass valve is smaller than an opening reference value, and employ the calculated intake air flow rate as the intake air flow rate when the opening of the bypass valve is larger than the opening reference value.

3. The intake air flow rate detection device for an internal combustion engine as defined in claim 2, wherein the controller is further programmed to increase the opening reference value of the bypass valve as an engine rotation speed increases.

4. The intake air flow rate detection device for an internal combustion engine as defined in claim 1, wherein the controller is further programmed to calculate an upper limit value on the basis of the calculated intake air flow rate and an upper limit side correction coefficient, calculate a lower limit value on the basis of the calculated intake air flow rate and a lower limit side correction coefficient, employ the upper limit value as the intake air flow rate when the measured intake air flow rate exceeds the upper limit value, employ the lower limit value as the intake air flow rate when the measured intake air flow rate is lower than the lower limit value, and employ the measured intake air flow rate as the intake air flow rate in all other cases.

5. The intake air flow rate detection device for an internal combustion engine as defined in claim 1, wherein the controller is further programmed to calculate the calculated intake air flow rate on the basis of a throttle opening and an engine rotation speed.

6. The intake air flow rate detection device for an internal combustion engine as defined in claim 1, wherein the controller is programmed to:
   when a vehicle in which the detection device is located is decelerating, employ either the measured intake air flow rate or the calculated intake air flow rate as an intake air flow rate of the intake passage on the basis of the bypass air flow rate, and
   when the vehicle is not decelerating, employ the measured intake air flow rate.

7. The intake air flow rate detection device for an internal combustion engine as defined in claim 2, wherein the controller is further programmed to calculate the opening of the bypass valve on the basis of a supercharging pressure in the intake passage on an upstream side of the throttle and a manifold pressure in the intake passage on a downstream side of the throttle.

8. The intake air flow rate detection device for an internal combustion engine as defined in claim 2, further comprising a position sensor that detects a position of a valve body of the bypass valve, wherein the controller is further programmed to calculate the opening of the bypass valve from a detection value of the position sensor.

9. An intake air flow rate detection method for an internal combustion engine, the engine comprising an intake passage through which intake air flows, a supercharging device that supercharges the intake air, a throttle that throttles the intake air downstream of the supercharging device, a bypass passage that bifurcates between the supercharging device and the throttle and converges with the intake passage upstream of the supercharging device, and a bypass valve that opens and closes the bypass passage, the method comprising:
 detecting an operating condition of the internal combustion engine;
 detecting an intake air flow rate using an air flow meter disposed in the intake passage upstream of the supercharging device;
 calculating a measured intake air flow rate from a detection value of the air flow meter;
 calculating a calculated intake air flow rate from the operating condition of the internal combustion engine; and
 employing either the measured intake air flow rate or the calculated intake air flow rate as an intake air flow rate of the intake passage on the basis of a bypass air flow rate, which is a flow rate of air circulated to the intake passage between the air flow meter and the supercharging device through the bypass passage,
 wherein the employing step comprises employing the measured intake air flow rate when the bypass air flow rate is not greater than a threshold value, and employing the calculated intake air flow rate when the bypass air flow rate is greater than the threshold value, the threshold value being a non-zero value beyond which the bypass air tows back to the air flow meter.

10. An intake air flow rate detection device for an internal combustion engine, the engine comprising an intake passage through which intake air flows, a supercharging device that supercharges the intake air, a throttle that throttles the intake air downstream of the supercharging device, a bypass passage that bifurcates between the supercharging device and the throttle and converges with the intake passage upstream of the supercharging device, and a bypass valve that opens and closes the bypass passage, the detection device comprising:
 first means for detecting an operating condition of the internal combustion engine;
 second means for detecting an intake air flow rate in the intake passage upstream of the supercharging device;
 third means for calculating a measured intake air flow rate from a detection value of the second means;
 fourth means for calculating a calculated intake air flow rate from the operating condition of the internal combustion engine; and
 fifth means for employing either the measured intake air flow rate or the calculated intake air flow rate as an intake air flow rate of the intake passage on the basis of a bypass air flow rate, which is a flow rate of air circulated to the intake passage between the second means and the supercharging device through the bypass passage,
 wherein the fifth means employs the measured intake air flow rate when the bypass air flow rate is not greater than a threshold value, and employs the calculated intake air flow rate when the bypass air flow rate is greater than the threshold value, the threshold value being a non-zero value beyond which the bypass air flows back to the second means.

* * * * *